United States Patent Office 3,286,719
Patented Nov. 22, 1966

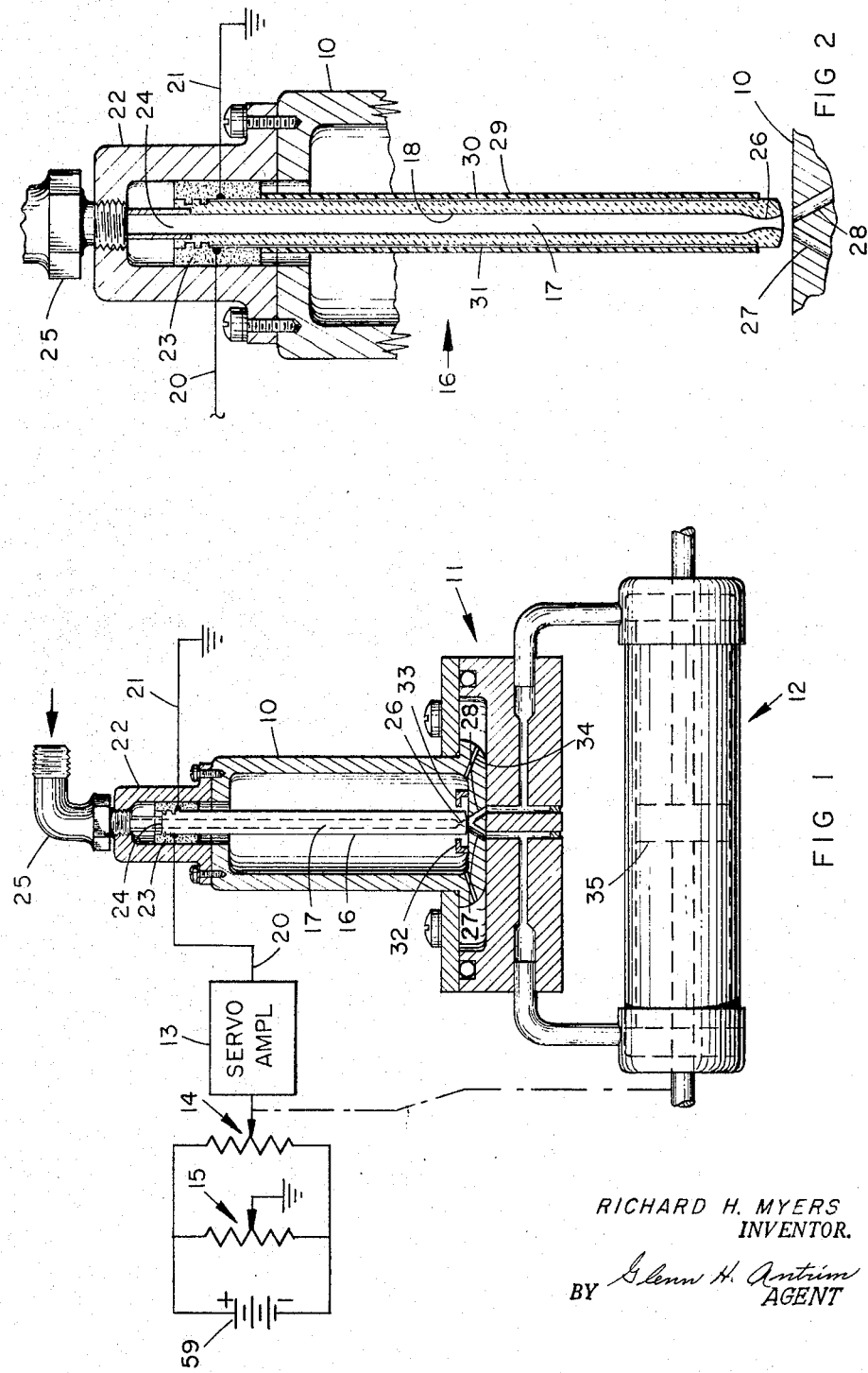

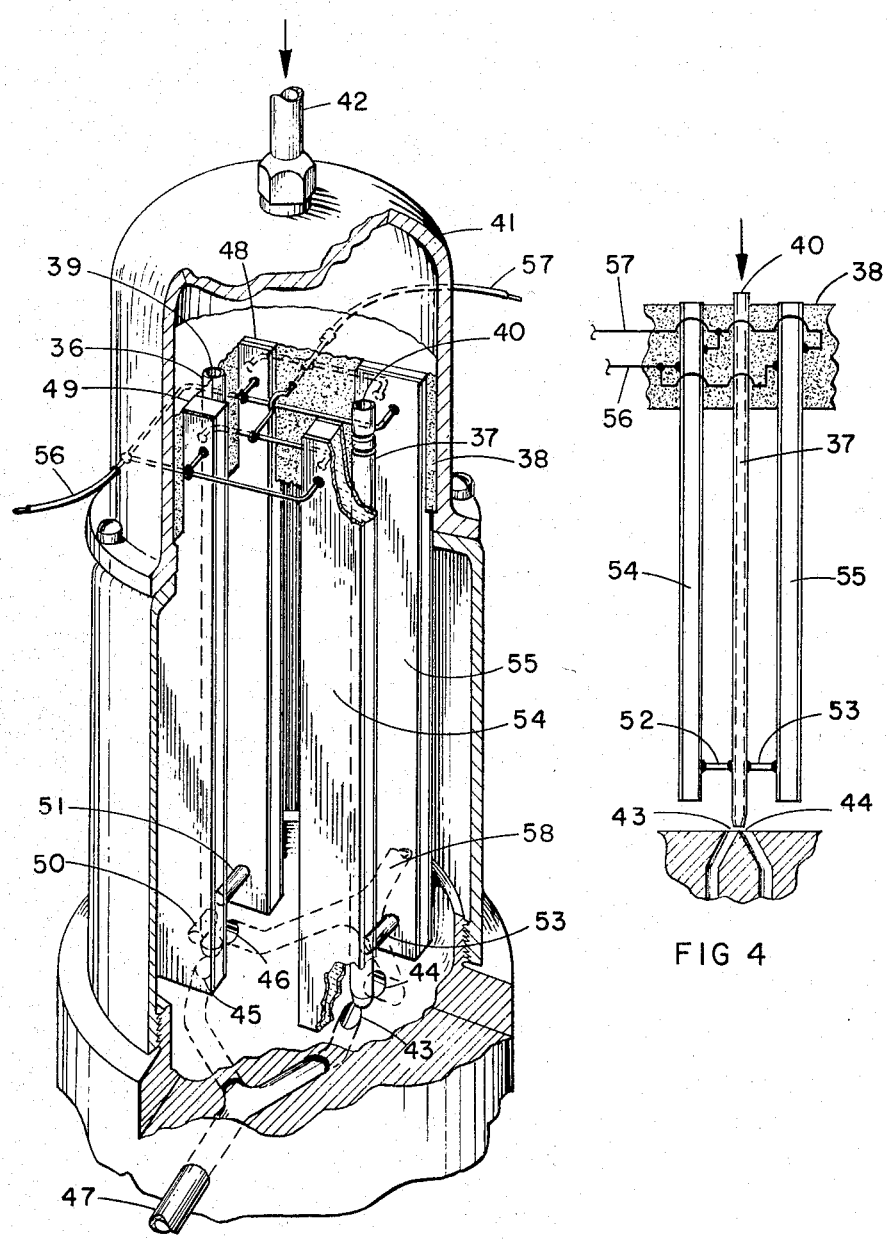

3,286,719
PIEZOELECTRIC FLUID JET TRANSFER VALVE
Richard H. Myers, Arlington, Tex., assignor to Ling-Temco-Vought, Inc., Dallas, Tex., a corporation of Delaware
Filed Dec. 30, 1963, Ser. No. 334,381
1 Claim. (Cl. 137—83)

This invention pertains to fluid jet transfer valves and particularly to jet valves having piezo-electric fluid control elements.

The valves according to the present invention have the advantage of being non-magnetic as taught by R. R. Johnson et al. in U.S. Patent 2,928,409 that issued March 15, 1960, and have the further advantage of the efficiency gained by a jet type valve as shown in U.S. Patent 2,990,-839, issued to W. A. Ray on July 4, 1961. Usually the fluids that are to be controlled by the valves are contaminated with magnetic particles. In the construction of magnetically controlled valves, sealing means must be provided to isolate the magnetic windings from the fluid chambers. The requirement for isolation has been eliminated in non-magnetic valves of the flapper type. However, the flappers of non-magnetic valves have a tendency to move from their desired control positions when they are required to be held constantly in position against fluid forces.

An object of the present invention is to provide a jet-type fluid valve of simpler construction than previous valves at low cost;

Another object is to obtain fast operating characteristics (high-frequency response) in a fluid transfer valve; and Another object is to provide a non-magnetic valve that does not require fluid isolating means between the energizing component parts and the stream of fluid that is being transferred.

A feature of the present valve is the absence of stresses that normally result from temperature gradients within component parts when magnetic isolation means is required.

Another feature that is derived from the simple, low-cost construction is the feasibility of paralleling fluid control conduits of multiple valves for increased reliability.

Other objects and advantages will be apparent from the specification and claim and from the accompanying drawing illustrative of the invention.

FIG. 1 shows a cross-section of a preferred piezo-electric valve of this invention;

FIG. 2 is a fragmentary, cross-sectional view of the piezo-electric jet conduit of the valve of FIG. 1;

FIG. 3 is a perspective view in partial section of multiple valves according to another embodiment of this invention; and FIG. 4 is a side view of one of the valves of FIG. 3.

Briefly, in FIG. 1, the piezo-electric valve of this invention is shown as contained within a valve housing 10 that is attached to a fluid coupling housing for coupling the piezo-electric valve to a conventional actuator 12. A conventional closed-loop servo amplifier 13 is coupled between the output of the actuator 12 and the input of the valve. In response to a change of direct-current voltage as a result of operation of a manually controlled potentiometer 15 or the operation of a servo controlled potentiometer 14, a piezo-electric bender 16 bends in a direction that is determined by the polarity of the applied voltage as described later. The bender 16 has a longitudinal conduit 17 for directing fluid into ports 27 and 28 valve housing 11. As to which port 27 or 28 receives the greater portion of the fluid stream is controlled by the valve and polarity of voltage between the opposite surfaces of the bender 16 in accordance with the positions of the arms of the potentiometers 14 and 15.

In detail, the piezo-electric bar 16 is supported as a cantilever within the elongated housing 10. The bar 16 shown in detail in FIG. 2, is fabricated from a ceramic material that is polarized to provide the desired bending function. When a bender was first conceived, it comprised two piezo-electric plates or bars cemented face to face. The direction of polarization of each of the component bars was oriented such that when an electric field was introduced across the assembled bar, the bar on one side became shorter while the bar on the opposite side became longer. A preferred bender for valve application is now fabricated from a solid piece of ceramic bar that is polarized radially with reference to one or more longitudinal holes midway between those sides to which electric charges are to be applied. The conduit 17 of FIG. 2 corresponds to one of these holes. A bender of this type but with smaller dimensions than those generally desirable for valve applications is manufactured for phonograph pickups. Typical dimensions of a bender recommended for valves are: length, 1 inch; width, 0.2 inch; and thickness, 0.1 inch. The cross-sectional area need not be rectangular, but may be oval or round.

Two opposite sides of the ceramic material 18 have respective thin conductive platings 30 and 31 between which voltage is applied through conductors 20 and 21. The conductors 20 and 21 are attached to the platings on respective sides of the bar near that end of the bar that is mounted to one end of the housing 10. An insulating layer 29 of impervious plastic material provides an outer protective coating for the bender 16 and prevents short-circuiting of the opposite conductive platings 30 and 31 when foreign particles are in the fluid that is being controlled by the valve.

For convenience in mounting the bar 16, a coupling and mounting 22 that has a cavity of a smaller diameter than the diameter of the cavity within the main housing 10 is centrally mounted on one end of the housing. The bar 16 is mounted longitudinally along the central axis of the housing 10 by putting the inlet end of the bar in a cement or potting compound 23 within the cavity of the mounting 22. The bar 16 might be mounted between metallic clamps within the coupling 22 before the potting compound 23 is applied. Since the force that is bending the bar 16 is evenly distributed along its length, the force at the mounting is moderate and the bar has little tendency to creep in the potting compound 23. The potting compound 23 provides a seal about the end of the bar 16 such that fluid under pressure may be applied to the inlet 24 of the conduit 17 of the bar without flowing directly into the housing 10. A source of high pressure fluid is coupled through a pipe or a hose coupling 25 to the cavity therein that communicates with the inlet 24.

The free end of the bar 16 has a converging-diverging nozzle 26. The nozzle 26 may be formed by molding the end of the bar, by ultrasonic machining, or by cementing on a short extension that contains the nozzle. Two closely spaced ports 27 and 28 in the end of the housing 11 are aligned with the nozzle 26 to receive a jet stream of fluid during slightly different positions of the bar 16 as it is caused to bend in response to change of voltage that is applied between the conductive platings 30 and 31 on a pair of opposite sides of the bar. The end of the nozzle 26 adjacent the ports 27 and 28 may be slightly convex to maintain even spacing between the end of the bar 16 and the end of the housing 10 during its travel. The spacing between the nozzle 26 and the ports 27 and 28 should be a minimum that permits free operation under changes of pressure and temperature. Stationary stops 32 and 33 are spaced on opposite sides of the free end of the bar 16 to limit its travel to only that required to obtain maximum flow into either one of the ports 27 or 28. A typical distance of maximum travel from the neutral position is .005 inch. For a certain displacement, the change in direction of flow of the fluid stream is greater than that through a simple cantilever conduit where the bending is concentrated near its mounting and the section near the nozzle is substantially straight. A plurality of return passageways 34 through the bottom of the housing 10 permits the leakage encountered between the nozzle 26 and the ports to drain into a return line (not shown) of the hydraulic system. The ports 27 and 28 are connected to opposite ends respectively of a conventional small actuator or hydraulic control 12.

In FIG. 3, two valves with conduits 36 and 37, respectively, are shown connected in parallel and are to be connected to a single actuator. Also, the conduits 36 and 37 controlled by the benders 48, 49, 54, and 55 are shown spaced parallel to the benders and joined thereto by a link rather than being centrally located within the bender as shown in FIG. 1. Each bender may be considered to be a separate driver, and the drivers may be connected in multiple to control a single conduit as also shown in FIG. 3.

The conduits or jet pipes 36 and 37 perform the function of conduit 17 of FIG. 1. The conduits 36 and 37 are mounted parallel as modified cantilevers. The end portions of the conduits 36 and 37 near the inlets 39 and 40 respectively are rigidly mounted in potting compound 38 within the upper portion 41 of the housing. The inlets 39 and 40 communicate with a chamber within the housing portion above the potting compound 38 to receive fluid under pressure that enters the chamber through the coupling 42 at the top of the housing 41. As described with reference to FIG. 1, the free end of each of the parallel conduits 36 and 37 are formed to function as nozzles for ejecting a jet stream. The ports 43 and 44 (FIG. 4) are positioned opposite the nozzle of conduit 37 and similarly the ports 45 and 46 are correspondingly positioned relative to conduit 36 to receive a jet stream for different positions of the respective conduit as described for FIG. 1. The corresponding ports for both nozzles that receive fluid simultaneously are coupled to a single conduit for connection to a single inlet of a control device such as actuator 12 of FIG. 1. Ports 43 and 45 are connected through individual conduits that gradually converge into conduit 47. Ports 44 and 46 converge into conduit 58.

Each control conduit 36 or 37 is coupled to a piezo-electric bender or to multiple benders as a driver to constrain the conduit to bend therewith. For example, conduit 39 has diametrically mounted benders 48 and 49 spaced parallel to the conduit. One end of each bender 48 or 49 is secured in the potting compound 38. A link 50 couples the free end of the bender 49 to the free end of the conduit 39, and the link 51 couples the free end of the bender 48 to the conduit 39 at a point diametrically opposite the connecting point of link 50. Likewise, the conduit 37 is coupled through links 52 and 53 (FIG. 4) to diametrically mounted piezo-electric benders 54 and 55 respectively. The walls of the conduits 39 and 40 are elastic enough to permit the piezo-electric benders to drive the conduits in a motion similar to that of a cantilever without heavily loading the benders. The piezo-electric benders 48, 49, 54, and 55 have respective pairs of conductive surfaces connected in parallel through conductors 56 and 57 to cause the benders to bend in unison in the same direction.

In operation, assume that the piston 35 of the actuator 12 of FIG. 1 has been moved to the right in response to operation of the piezo-electric bar 16. This operation has resulted from operation of the manual potentiometer 15 to perform a control function and the potentiometer 15 has just been returned to its normal, neutral position.

Since the arm of the follow-up potentiometer 14 has not yet been returned to its neutral position by the return of the piston 35 to its central positon, a difference of potential exists between the arm of the potentiometer 14 and ground for application by the conductors 20 and 21 between the surface platings 30 and 31 of the bar 16. This potential has the required polarity to cause the bar 16 to bend such that nozzle 26 is more nearly aligned with the port 28 than it is with the port 27. The power fluid stream that enters coupling 25 is directed into the port 28 to force the piston 35 to move from right to left in an obvious manner. As the piston is moved, fluid from the left portion of the cylinder of actuator 12 is forced upward out of the port 27. The fluid that is forced out of the port is returned through return passageways 34. As the piston approaches its commanded position, the servo applifier 13 applies a decreasing potential to the bender 16 until the bender is returned to its normal central positon and the piston 35 is in its new position according to the command. Since the platings 30 and 31 of the bar 16 are at the same potential because of similar settings of the arms of the potentiometers 14 and 15, the nozzle 26 is centrally positioned relative to ports 27 and 28 to equalize the pressure on opposite sides of piston 35.

In FIG. 1, the voltage for the bender 16 is shown derived from a high voltage, direct-current source 59. In practice, either a direct-current or an alternating-current amplifier may be connected between an input control and the conductor that is connected to the conductive plating 31 of the bender 16. Because of the high compliance and the low mass of the bender, it may be vibrated at high frequency. In certain applications of the valve, the source of operating voltage is alternating current. The bender is then always vibrating while the valve is in use and is controlled by varying the mean voltage level that is applied between the surfaces of the bender. In this manner the piston 35 is stationary when the vibration is centered over the ports 27 and 28 but is moved in response to the vibration being biased toward one port and away from the other. Valves are in certain systems controlled by pulse-width modulation of waves of substantially square shape. By varying the width of the positive portion of each of the waves relative to the width of the negative portion of each of the waves, the interval of each cycle that the nozzle remains over one port will be varied relative to the interval that it remains over the opposite port to provide a velocity to the piston 35.

Each of the parallel valves with conduits 36 and 37 respectively of FIG. 3 functions in the manner described for the single valve of FIG. 1. Because of the simple, compact design and the resulting low cost, the use of multiple valves for single control functions is feasible. For example, when two valve sections are operated in parallel and the system in which the valve is incorporated has been desgined to function from the output of either one or of both sections, failure due to clogging by foreign particles is less probable.

The valve of the present invention has several advantages that have not previously been incorporated in a single valve. The valve is compact, simple in construction, and inexpensive. The power input for its operation is much less than that required by prior valves, and it will respond quickly to changes of input voltage. No additional structure, corresponding to that required in magnetic valves, is required to guard against magnetic foreign particles that are generally present in the fluid of the power stream. Since isolation tubes are not required as in magnetic valves, the temperature throughout the valve is relatively constant at the temperature of the power fluid and stresses due to temperature differences are substantially eliminated. Upstream orifices of the type required in flapper valve construction are not required. Greater efficiency is obtained in the jet type valve.

While only certain embodiments of the invention have been described in detail herein and shown in the accompanying drawing, it will be evident that various further modifications are possible in the arrangement and construction of its components without departing from the scope of the invention.

I claim:

A jet transfer valve comprising a piezo-electric bender, a conduit having an inlet at one end and a nozzle at the other, means for securely mounting one end of said bender and one end of said conduit, said conduit and said bender being constrained in movement so that their free ends opposite their respective mountings move in an arc in unison in a predetermined plane, means for connecting a fluid power stream to said inlet, a plurality of ports, said ports being disposed adjacent the path that is traveled by said nozzle during its travel in said arc, means for applying controlled amounts of electric charge to opposite faces of said bender to cause said free end to move in said predetermined arc, and said ports being disposed in said plane and aligned with said nozzle so that a different one of said ports receives fluid from said power stream for a different respective position of said nozzle as determined by the amount of charge applied to said bender.

References Cited by the Examiner

UNITED STATES PATENTS

| | | | |
|---|---|---|---|
| 2,928,409 | 5/1960 | Johnson | 91—51 X |
| 3,017,864 | 1/1962 | Atchley | 137—83 X |
| 3,063,422 | 11/1962 | Gregowski | 137—82 X |
| 3,137,309 | 6/1964 | Blase | 137—83 |

ALAN COHAN, *Primary Examiner.*